(12) United States Patent
Bontjer et al.

(10) Patent No.: US 8,551,548 B2
(45) Date of Patent: *Oct. 8, 2013

(54) METHOD, DEVICE AND PRODUCT CARRIER FOR EFFECTIVE DRYING OF CO-EXTRUDED FOOD PRODUCTS

(75) Inventors: Marcus Bernhard Hubert Bontjer, Aarle Rixtel (NL); Sigebertus Johannes Jacobus Jozef Meggelaars, Eindhoven (NL); Paulus Johanus Maria Thoonsen, Vught (NL); Kasper Willem Van Den Berg, Oss (NL)

(73) Assignee: Stork Townsend B.V., Oss (NL)

( * ) Notice: Subject to any disclaimer, the term of this patent is extended or adjusted under 35 U.S.C. 154(b) by 2364 days.

This patent is subject to a terminal disclaimer.

(21) Appl. No.: 11/458,423

(22) Filed: Jul. 19, 2006

(65) Prior Publication Data

US 2007/0059416 A1 Mar. 15, 2007

(30) Foreign Application Priority Data

Sep. 12, 2005 (NL) .................................... 1029932

(51) Int. Cl.
*A23L 1/31* (2006.01)
(52) U.S. Cl.
USPC ............. 426/277; 426/276; 426/105; 426/92; 426/135; 426/140; 426/516; 426/518

(58) Field of Classification Search
USPC ................... 426/92, 105, 276–277, 516, 518, 426/135, 140
See application file for complete search history.

(56) References Cited

U.S. PATENT DOCUMENTS

| | | | | |
|---|---|---|---|---|
| 3,041,182 A | * | 6/1962 | Hansen et al. | 426/92 |
| 3,622,353 A | * | 11/1971 | Bradshaw et al. | 426/284 |
| 5,271,948 A | * | 12/1993 | Boni et al. | 426/278 |
| 5,695,800 A | * | 12/1997 | Merritt, II | 426/277 |
| 6,419,968 B1 | | 7/2002 | Wang et al. | |
| 2004/0037922 A1 | * | 2/2004 | Goorhuis | 426/89 |
| 2004/0091581 A1 | * | 5/2004 | Joly et al. | 426/92 |
| 2005/0031741 A1 | * | 2/2005 | Morgan et al. | 426/135 |

FOREIGN PATENT DOCUMENTS

| | | |
|---|---|---|
| NL | 1 007 039 | 1/1999 |
| RU | 2204919 C1 * | 5/2003 |
| WO | WO 95/28090 | 10/1995 |
| WO | WO 99/60870 | 12/1999 |

* cited by examiner

*Primary Examiner* — Drew Becker
*Assistant Examiner* — Luana Z Long
(74) *Attorney, Agent, or Firm* — Zarley Law Firm, P.L.C.

(57) ABSTRACT

The invention relates to a method for manufacturing co-extruded food products, comprising the processing steps of: A) co-extruding an elongate dough strand with an enclosing casing, B) bringing the encased elongate food strand into contact with a salt solution for a maximum of 5 seconds, and C) dividing the encased elongate food strand into separate products. The present invention also relates to a device for manufacturing co-extruded food products.

10 Claims, 1 Drawing Sheet

METHOD, DEVICE AND PRODUCT CARRIER FOR EFFECTIVE DRYING OF CO-EXTRUDED FOOD PRODUCTS

BACKGROUND AND SUMMARY OF THE INVENTION

The present invention relates to a method for manufacturing co-extruded food products, comprising the processing steps of: A) co-extruding an elongate dough strand with an enclosing casing, B) bringing the encased elongate food strand into contact with a salt solution for a maximum of 5 seconds, and C) dividing the encased elongate food strand into separate products. The present invention also relates to a device for manufacturing co-extruded food products, comprising: co-extrusion means for simultaneously manufacturing an elongate dough strand and an enclosing casing, supply means for bringing the co-extruded food product into contact with a salt solution for a maximum of 5 seconds, separating means for dividing the encased elongate food product into separate products, and drying means provided with means disposed in a drying space for generating an airflow. The invention moreover provides a specific product carrier for application in such a device.

DETAILED DESCRIPTION OF THE PREFERRED EMBODIMENT

Figure 1:
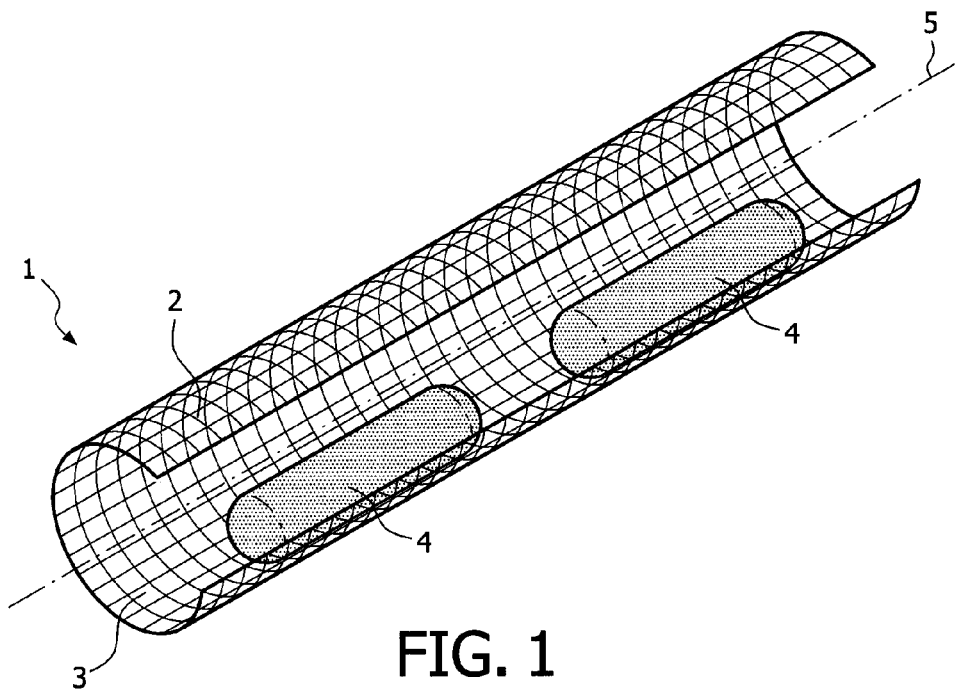
FIG. 1 is a perspective view of a product carrier.
Figure 2A:
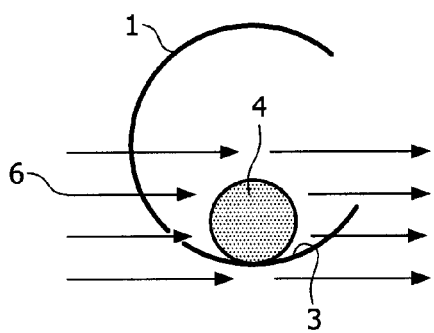
FIG. 2A is an end view of a product carrier.
Figure 2B:
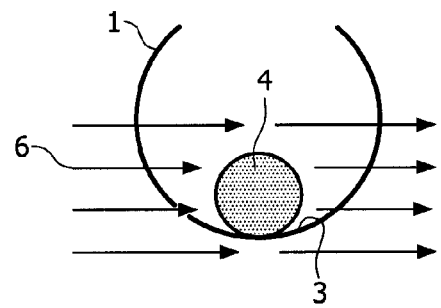
FIG. 2B is an end view of a product carrier.
Figure 2C:
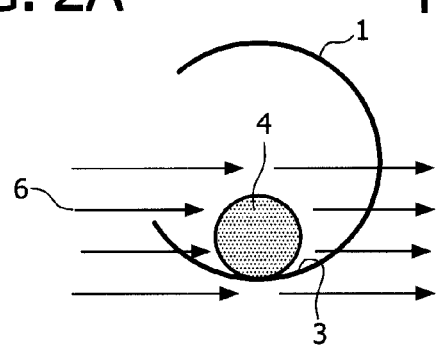
FIG. 2C is an end view of a product carrier.

In the co-extrusion of food products dough is extruded from a nozzle such that an elongate dough strand is formed. Simultaneously with the extrusion of the dough strand a skin (casing) is arranged around the dough strand, likewise by means of extruding a material suitable for this purpose, usually a collagen mixture or an alginate mixture. Food products 4 (in particular sausages) are thus manufactured by means of the simultaneous extrusion (co-extrusion). The food products 4 usually consist of meat products, but it is also possible to manufacture vegetarian products with a non-animal casing in this manner. The material with which the casing is manufactured is viscous immediately after arranging thereof around the meat strand. In order to give the casing some strength so that subsequent treatment and processing steps are possible, it is desirable to extract water from the casing as quickly as possible such that it obtains a mechanical strength. For this purpose the casing is usually brought into contact with a salt solution immediately after the extrusion to have the casing acquire a stronger structure (so-called precipitation in the case of a collagen mixture or gelling in the case of an alginate mixture). The extrusion product is then divided with a separator, making use of for instance a crimper or a linker. After the separation the separated products 4 are placed in a drying space where the casing is dried further. It is subsequently possible to treat the products with a smoke extract or a liquid smoke, whereafter the smoked products are dried once again with the same process air as applied in the above described drying space. Such a process run is described inter alia in Netherlands patent publication NL 1007039. The drying means applied in the prior art are very voluminous. This results in a normal duration of stay in the drying means of about 24 minutes for an extrusion product with a diameter of 24 mm, this at a temperature usually lying between 65° C. and 95° C.

The present invention has for its object to provide an improved method and device with which the drying process can be performed in more effective manner than in the prior art.

The present invention provides for this purpose a method of the type stated in the preamble, wherein the co-extruded food products 4 also undergo a drying treatment by being subjected to an airflow 6, which airflow has a temperature of at least 95° C. at the start of the drying process. It is even more advantageous if the initial temperature of the airflow 6 is at least 100° C., 105° C., or even more preferably at least 110° C. At such a relatively high temperature of the airflow 6 the drying treatment will obviously proceed more quickly. Heretofore the idea prevailed that drying of co-extruded food products at such high temperatures was not possible, and that this would result in damage to the products or the casing thereof. Depending on the conditions, a number of specific conditions must however be fulfilled here, of which especially the short contact time with a salt solution is particularly relevant. Furthermore, particularly when a casing of collagen is applied, it is desirable to maximize the initial temperature of the airflow at 125° C., preferably at a maximum of 120° C. The cause hereof is that the chemical stability of a collagen casing disappears when such a temperature is exceeded. If use is made of a casing of alginate such a restriction of the temperature range does not however apply. The term "initial" indicates the moment at which the airflow 6 comes into contact with the co-extruded food products for the first time.

Another condition with which the drying action of the gas flow can be defined is the air humidity; initially this is preferably a maximum of 25 grams of water per kilogram of air. An even better effect can be achieved at an air humidity of less than 20 or 15 grams of water per kilogram of air. Another important process condition with which the drying time can be shortened is the average flow speed of the air; this must preferably be greater than 3 meters per second, or more preferably greater than 4 or 5 meters per second.

Yet another problem which must be resolved is that the carrier means 1 with which the individual products 4 are supported during the drying may not leave any markings, or at least any visible markings, on the products. It is precisely now that the casing is brought into contact with a salt solution for only a short time that this casing will be susceptible to such markings. It is desirable for this purpose that the products are moved relative to the dominant airflow 6 during drying such that they are blown dry from opposite sides. There will hereby be no (or at least a greatly reduced degree of) uneven drying of the products. It is also desirable that the co-extruded food products are supported during the drying process by carrier means 1 with a contact surface 3 consisting of a material 2 with a coefficient of conductivity of less than 0.25 W K$^{-1}$ m$^{-1}$. Material 2 with such a limited coefficient of conductivity are less likely to result in visible markings (also referred to as "contact marking") of the products. In a preferred variant of the device according to the invention use is made for this purpose of product carriers 1 having a contact surface 3 which is heat-conducting to only a limited extent. This is possible for instance by applying product carriers manufactured from plastic, more particularly polyester or another temperature-resistant plastic.

Yet another measure which, depending on the conditions, can contribute toward an improved drying result at higher air temperatures is that the co-extruded food products 4 are supported during the drying treatment by the carrier means 1 such that they move off the contact surface with the carrier means at changing positions during the drying process. It hereby becomes possible for the airflow 6 to make contact for some time with all positions of the food products for drying, which further enhances uniform drying of the products. It is also advantageous if the co-extruded food products 4 are supported during the drying treatment by carrier means 1 with a contact surface of which at least 65% is provided with openings for passage of the airflow. The airflow can thus contact the product for drying to a sufficient degree.

There are several possibilities in respect of the composition of the casing material in combination with an associated salt solution. A casing manufactured from a collagen mixture can thus be applied in combination with a salt solution comprising one of the substances: sodium chloride, sodium carbonate or dipotassium phosphate (DPP), or a casing of an alginate mixture can be applied in combination with a salt solution comprising calcium ions.

As already stated above, the present invention also provides a device of the type stated in the preamble, with the feature that the drying means are provided with heating means for heating the airflow 6 to at least 100° C. The present invention relates to the combination of such a high temperature of the airflow 6 and a short contact time with a casing which is treated with salt and therefore fragile. This is contrary to the assumption that precisely such a fragile casing cannot be exposed to very severe conditions. A specific shape of the carrier means 1, C-shaped in cross-section, can herein also be advantageous. By rotating the carrier means around their longitudinal axis through at least a part of the circle using a support construction, a product 4 for drying lying in the C-shaped carrier can roll over the contact surface 3 such that after a period of time the surface of the product comes into contact with the drying air on all sides and will hereby dry evenly on all sides. In addition to a quicker drying, this also has the advantage that the chance of markings of the carrier being left in the product 4 can thus be reduced. The carrier means 1 (basket) of C-shaped cross-section can advantageously be rigidly connected to a transporting element such as a chain. By causing the chain to follow a vertically up and downward path the transporting means will then make forced movements, as a result of which the extrusion products will move (roll) in the carrier means 1, which allows drying of the whole exterior of the products.

In yet another embodiment variant the device is provided with conditioning means for the air humidity of the airflow 6. It is possible here to envisage cooling means and venting means for the discharge of process air. For an effective and efficient drying of the products 4 inside the defined process areas, the air humidity must preferably be less than 25 grams of water per kilogram of air, more preferably less than 20 or 15 grams of water per kilogram of air.

The invention moreover provides an elongate product carrier 1 of C-shaped cross-section such as forms part of the above described device according to the invention, with the feature that the internal contact surface 3 of the product carrier 1 has a coefficient of conductivity less than $0.25 \, M \, K^{-1} \, m^{-1}$. This is possible for instance by manufacturing the contact surface 3 from polyester. In order to increase the effectiveness of the device it is advantageous to give the product carrier(s) 1 a relatively long form; a greater drying capacity directly proportional to the length of the product carriers can thus be obtained with a single drive mechanism; if desired it is advantageous when the product carrier 1 has the unusually considerable length of at least 1.5 m.

The invention claimed is:

1. Method for manufacturing co-extruded food products, comprising the processing steps of:
    A) co-extruding an elongate dough strand with an enclosing casing,
    B) bringing the encased elongate food strand into contact with a salt solution for a maximum of 5 seconds, and
    C) dividing the encased elongate food strand into separate products,
    wherein the co-extruded food products also undergo a drying treatment by being subjected to an airflow, which airflow has a temperature of a minimum of 95° C. at the start of the drying process.

2. Method as claimed in claim 1, characterized in that an initial temperature of the airflow is a minimum of 100° C.

3. Method as claimed in claim 1, characterized in that an initial temperature of the airflow is a maximum of 125° C.

4. Method as claimed in claim 1, characterized in that air humidity of the airflow is initially a maximum of 25 grams of water per kilogram of air.

5. Method as claimed in claim 1, characterized in that an average flow speed of the air is greater than 3 meters per second.

6. Method as claimed in claim 1, characterized in that the casing comprises a collagen mixture and the salt solution comprises at least one of the substances: sodium chloride, sodium carbonate or dipotassium phosphate.

7. Method as claimed in claim 1, characterized in that the casing comprises an alginate mixture and the salt solution comprises calcium ions.

8. Method as claimed in claim 1, characterized in that during drying by the air the products for drying are moved relative to the dominant airflow such that they are blown dry from opposite sides.

9. Method as claimed in claim 1, characterized in that the co-extruded food products are supported by a carrier means during the drying treatment such that they are released from a contact surface with the carrier means at changing positions during the drying process.

10. Method as claimed in claim 1, characterized in that the co-extruded food products are supported during the drying treatment by carrier means with a contact surface of which at least 65% is provided with openings for passage of the airflow.

* * * * *